P. S. BAUER.
LIFTING DEVICE FOR VEHICLE WHEELS.
APPLICATION FILED JAN. 26, 1916.
1,203,460.
Patented Oct. 31, 1916.
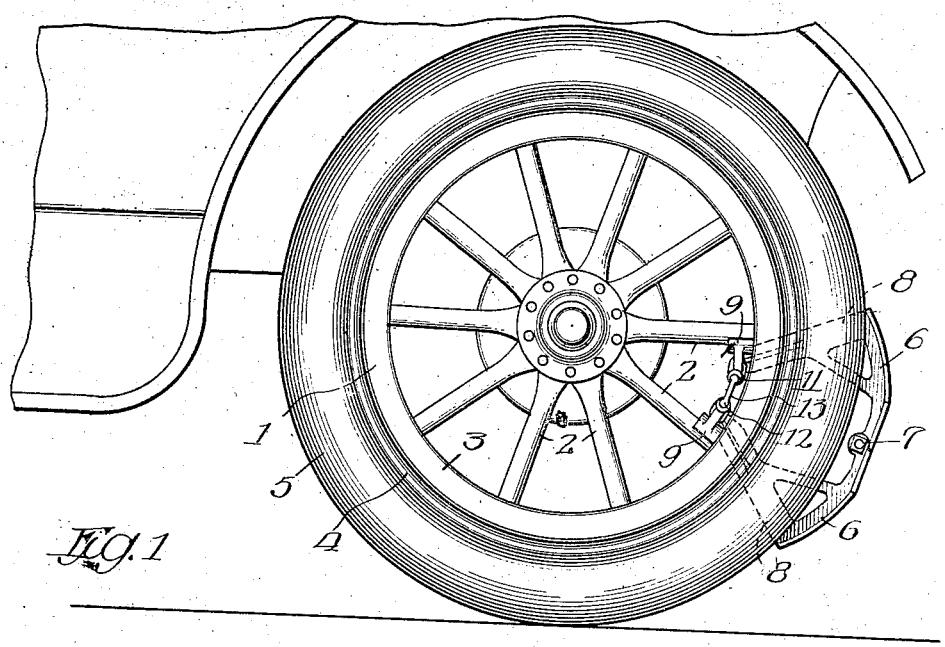
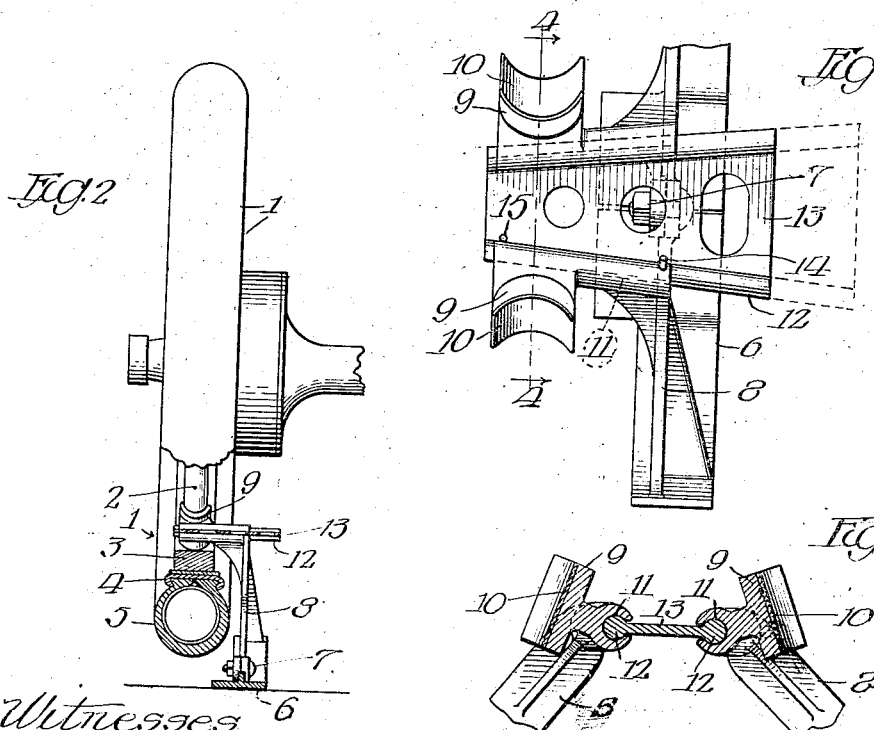
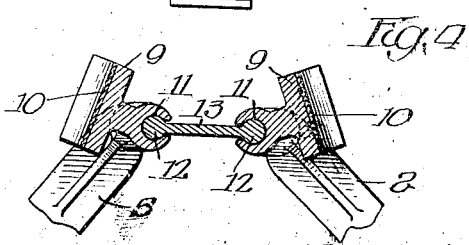
Witnesses
Inventor
Perry S. Bauer

UNITED STATES PATENT OFFICE.

PERRY S. BAUER, OF CHICAGO, ILLINOIS.

LIFTING DEVICE FOR VEHICLE-WHEELS.

1,203,460.        Specification of Letters Patent.        Patented Oct. 31, 1916.

Application filed January 26, 1916. Serial No. 74,347.

*To all whom it may concern:*

Be it known that I, PERRY S. BAUER, a citizen of the United States, residing at Chicago, in the county of Cook and State of Illinois, have invented certain new and useful Improvements in Lifting Devices for Vehicle-Wheels, of which the following is a specification.

This invention relates to a device for lifting vehicle wheels which is particularly adapted for use in connection with the removal and replacement of the tires of automobile wheels although not necessarily limited to this specific use.

In many modern types of automobiles considerable difficulty is experienced in placing an ordinary jack under the rear axle owing to the arrangement of the fuel tank and spare tires rearwardly thereof. Moreover, the work involved in operating a jack of the ordinary type under a heavy vehicle is arduous.

It is an object, therefore, of my invention to provide a device of a simple and inexpensive character which overcomes the disadvantages above enumerated.

A further object of my invention is the provision of a lifting device which may quickly and without difficulty be secured to and removed from a vehicle wheel and which will automatically lift the outer periphery of the wheel from the surface along which it rolls.

Further objects and advantages of my invention will be apparent as it is better understood by reference to the following specification when read in connection with the accompanying drawing in which—

Figure 1 is a side elevation of an automobile wheel with my invention secured thereto in its position prior to the lifting operation; Fig. 2 is an end elevation partially in section, of a wheel with the lifting device applied thereto in lifting position; Fig. 3 is a plan view of the lifting device, and Fig. 4 is a vertical section on the line 4—4 of Fig. 3.

Referring to the drawing, 1 indicates a vehicle wheel comprising spokes 2 connected to a felly 3, a rim 4 and a tire 5.

My improved lifting device consists of a foot comprising the foot member 6 pivotally connected at 7. Rigid arms 8 are connected to the foot members 6 and have at their extremities members 9 adapted to engage adjacent spokes 2 of the wheel 1. The members 9 are preferably provided on their spoke-engaging faces with resilient material 10, such as leather or other suitable material (Fig. 3), to prevent injury of the spokes. The ends of the arms 8 are slotted at 11 to receive the beads 12 on the edges of a wedge-shaped member 13 which, when moved transversely of the lifting device, causes the members 9 to move toward or from the adjacent spokes 2 to clamp the lifting device to the wheel 1 or release it therefrom. A lug 14 is formed on the extremity of the arm 8 adjacent one of the slots 11 and a pin 15 is secured to the member 13 to prevent complete withdrawal of the member 13 from the slots 11 after the device has been assembled.

The manner of applying my improved lifting device to a vehicle wheel will be apparent from an inspection of Figs. 1 and 2 of the drawings. The members 9 are inserted between a pair of spokes 2 with the arms 8 adjacent the inner face of the wheel 1 and extending beyond the periphery thereof. The wedge-shaped member 13 is then moved transversely in the slots 11 to separate the members 9 and lock them against the spokes 2. Preferably the member 13 is tapped lightly with a hammer or other tool to insure that the members 9 are tightly clamped against the spokes 2. The vehicle is then moved, preferably under its own power, and as soon as the wheel 1 is rotated to a position in which one of the foot members 6 of the lifting device engages the surface along which the wheel 1 rolls it will automatically lift the wheel from the surface. The vehicle is stopped when the lifting device is in the position indicated in Fig. 2 and the operation of removing and replacing the tire may be then carried out, after which the vehicle is again moved under its own power and the wheel rides off of the lifting device, which may then be removed.

My improved lifting device may be applied to front or rear wheels and to the wheels on either side of the vehicle and is particularly useful in connection with the rear wheels of the vehicle for the reason that it is not necessary to reach the axle in order to apply the lifting device as is necessary with jacks of the ordinary type. Furthermore, the labor which is necessary to operate the jack of the ordinary type is entirely eliminated in the use of my improved lifting device, the power of the vehicle being employed to accomplish the lifting. It will be further understood that various changes may be made in the form, construction and arrangement of the parts without departing from the spirit and scope of the invention or sacrificing any of its material advantages, the form hereinbefore described being merely preferred embodiment thereof.

I claim:

1. A lifting device for vehicle wheels, comprising a pair of pivotally connected complementary foot members, means for securing the device to a wheel, and means connecting said securing means and foot members to maintain the latter in spaced relation with the outer periphery of the wheel.

2. A lifting device for vehicle wheels, comprising means for securing the device to a wheel, including spaced members adapted to engage adjacent spokes of the wheel, and means for locking said spaced members in spoke-engaging position, a foot, and rigid means adapted to support the weight of the vehicle connecting said securing means and foot, whereby the latter is maintained in spaced relation with the outer periphery of the wheel.

3. A lifting device for vehicle wheels, comprising means for securing the device to a wheel, including spaced, relatively movable members adapted to engage adjacent spokes of the wheel and means for locking said spaced members in spoke-engaging position, a foot, and rigid means adapted to support the weight of the vehicle connecting said securing means and foot, whereby the latter are maintained in spaced relation with the outer periphery of the wheel.

4. A lifting device for vehicle wheels, comprising a pair of pivotally connected complementary foot members, means for securing the device to a wheel, including spaced members adapted to engage adjacent spokes of a wheel and means for locking said spaced members in spoke-engaging position, and means rigidly connecting said spaced and foot members, whereby the latter are maintained in spaced relation with the outer periphery of the wheel.

5. A lifting device for vehicle wheels, comprising a pair of pivotally connected complementary foot members, rigid arms connected thereto, members connected to said arms and adapted to engage adjacent spokes of a wheel, and means between the spoke engaging members to move the latter to spoke-engaging position, whereby the device is secured to the wheel with said foot members disposed in spaced relation to the outer periphery thereof.

6. A lifting device for vehicle wheels, comprising a pair of pivotally connected complementary foot members, rigid arms connected thereto, members connected to said arms and adapted to engage adjacent spokes of a wheel, and a wedge connecting said arms to move the spoke-engaging members to spoke-engaging position, whereby the device is secured to the wheel with said foot members disposed in spaced relation to the outer periphery thereof.

7. A lifting device for vehicle wheels, comprising a pair of pivotally connected complementary foot members, rigid arms connected thereto, members connected to each of said arms and adapted to engage adjacent spokes of a wheel, a wedge disposed between the spoke-engaging members to move the latter to spoke-engaging position, whereby the device is secured to the wheel with said foot members disposed in spaced relation to the outer periphery thereof, and interengaging means on said wedge and arms to maintain the former in operative position.

8. A lifting device for vehicle wheels comprising means for securing the device to a wheel including spaced members adapted to engage adjacent spokes of the wheel and means disposed between said spaced members for locking them in spoke-engaging position, a foot, and means connecting said securing means and foot, whereby the latter is maintained in spaced relation with the outer periphery of the wheel.

9. A lifting device for vehicle wheels comprising means for securing the device to a wheel including spaced relatively movable members adapted to engage adjacent spokes of the wheel and means disposed between said spaced members for locking them in spoke-engaging position, a foot, and means connecting said securing means and foot, whereby the latter is maintained in spaced relation with the outer periphery of the wheel.

10. A lifting device for vehicle wheels comprising a pair of complementary foot members, rigid arms connected thereto, members connected to said arms and adapted to engage adjacent spokes of a wheel, and means between the spoke-engaging members to move the latter to spoke-engaging position, whereby the device is secured to the wheel with said foot members disposed in spaced relation to the outer periphery thereof.

11. A lifting device for vehicle wheels comprising a pair of complementary foot members, rigid arms connected thereto, members connected to said arms and adapted to engage adjacent spokes of a wheel, and a wedge connecting said arms to move the spoke-engaging members to spoke-engaging position, whereby the device is secured to the wheel with said foot members disposed in spaced relation to the outer periphery thereof.

12. A lifting device for vehicle wheels comprising a pair of complementary foot members, rigid arms connected thereto, members connected to each of said arms and adapted to engage adjacent spokes of a wheel, a wedge disposed between the spoke-engaging members to move the latter to spoke-engaging position, whereby the device is secured to the wheel with said foot members disposed in spaced relation to the outer periphery thereof, and interengaging means on said wedge and arms to maintain the former in operative position.

PERRY S. BAUER.

Witnesses:
F. E. RAND,
J. H. RAPP.